July 24, 1956
J. G. SCHABERG
2,756,357
DYNAMO ELECTRIC DEVICE
Filed Nov. 4, 1953
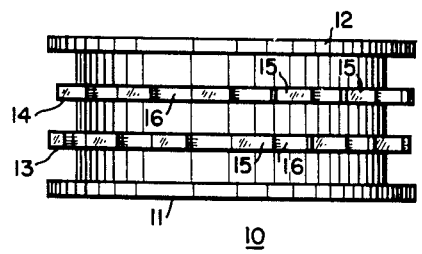
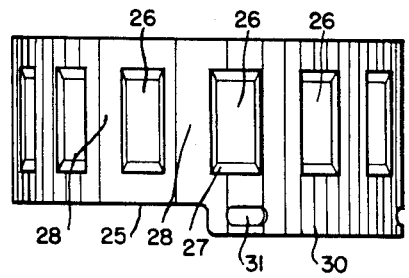
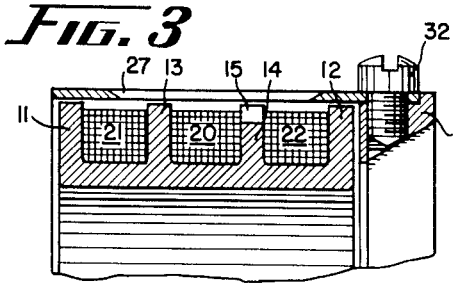
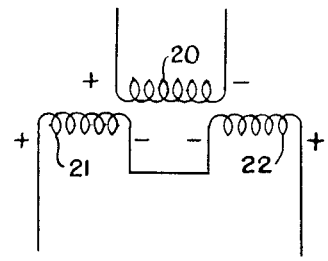
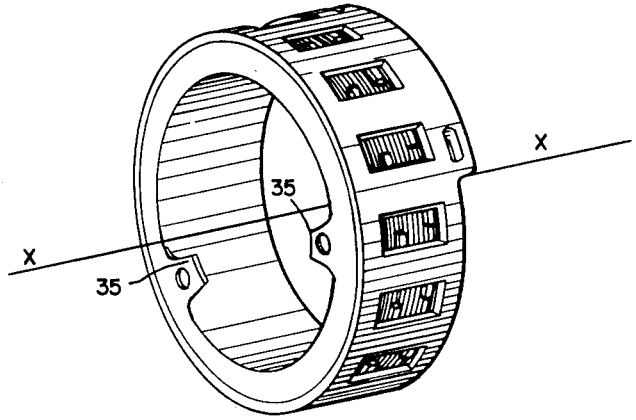
*INVENTOR.*
JOHANNES G. SCHABERG
BY George H Fisher
*ATTORNEY*

United States Patent Office 2,756,357
Patented July 24, 1956

2,756,357

DYNAMOELECTRIC DEVICE

Johannes G. Schaberg, St. Paul, Minn., assignor to Minneapolis-Honeywell Regulator Company, Minneapolis, Minn., a corporation of Delaware Application November 4, 1953, Serial No. 390,180

14 Claims. (Cl. 310—168)

This invention relates to dynamoelectric devices and particularly to an improved dynamoelectric transformer which has use as a signal generator, an accelerometer and an electromagnetic damper.

It is the object of this invention to provide an improved dynamoelectric device or transformer which provides a relatively simple magnetic circuitry and structure, which is easy and economical to manufacture, and which is very light in weight and provides a highly sensitive apparatus.

It is further an object of this invention to provide a simplified electromagnetic structure which may perform a plurality of operations such as signal generation, acceleration sensing and electromagnetic damping without modification to the apparatus.

It is another object of this invention to provide an improved dynamoelectric transformer which is extremely sensitive to small increments of rotational movement.

These and other objects of this invention will become apparent from the reading of the attached description together with the drawings wherein:

Figure 1 is a plan view of the stator of my improved dynamoelectric device without the windings, Figure 2 is a plan view of the rotor of my improved dynamoelectric device, Figure 3 is a sectional view of a portion of my improved dynamoelectric device showing the relationship between the rotor and stator, and Figure 4 is a perspective view of my improved dynamoelectric device, Figure 5 is a wiring diagram of one possible application of my improved dynamoelectric device showing instantaneous polarities.

My improved dynamoelectric transformer comprises a stator which is generally annular in form as shown in Figure 1 and indicated by the numeral 10. The stator is made of a magnetic material and has a pair of transversely extending flanges 11 and 12 at the extremities or periphery thereof, the flanges being uniform and symmetrical. Intermediate the peripheral flanges 11 and 12 are positioned a pair of intermediate flanges 13 and 14 which divide the outer periphery of the stator into three channels. The intermediate flanges have substantially the same radial dimension as the outer peripheral flanges and have in addition pole teeth formed thereon indicated at 15 with a predetermined spacing between the pole teeth indicated at 16. The pole teeth or polar projections 15 on one of the intermediate flanges 13 are positioned adjacent the spacing 16 between similar projections or poles 15 on the opposite flange 14. Any number of polar projections may be used on the stator, the only limitation being the practical width of the pole teeth and the desired operating range or movement of the rotating portion of the apparatus. In Figure 3 it will be seen that the stator has positioned thereon three windings wound in the three channels formed by the flanges 11—14 on the stator. The intermediate flanges 13 and 14 encircle or define an opening in which a winding 20 is positioned, this winding will be designated in this instance as an exciting winding. Positioned in the channels formed by the flange 13 and 11 and 14 and 12 respectively are additional windings 21 and 22 to be identified in this instance as secondary windings. The windings 21 and 22 are adapted to be connected in series opposition relation as shown in Figure 5, for purposes to be later described. The windings are wound on the stator and within the channels in a conventional manner.

While the subject invention is disclosed herein as having the centrally located winding as the exciting winding and the outside windings as the secondary windings, it should be noted that the outside windings may be the exciting windings and the single centrally located winding may be the secondary winding. With this arrangement the exciting windings may be either serially or parallel connected and should be considered as a single winding with portions located in the outer channels.

A rotor element 25 for the dynamo transformer is shown in Figure 2, the rotor element being also annular in form and made of a magnetic material. Positioned in the rotor element are a plurality of apertures such as are indicated at 26, the apertures being equidistantly spaced apart and being of the dimension substantially equal to the portion of the rotor element between the apertures. It will further be seen that the apertures have tapered sides such as is indicated in 27 in Figures 2 and 3. The apertures in the periphery of the rotor define a plurality of magnetic paths 28 along the extent of the rotor. These magnetic paths in relation to the stator are such that the paths cover an area between center lines adjacent to pole teeth of opposite flanges 13 and 14. This will be seen in Figure 4. The rotor element also has a peripheral section indicated at 30 which serves as a mounting flange and includes mounting apertures 31 through which suitable screw means such as 32 in Figure 3 may be inserted to connect the rotor element to a stationary or moveable support indicated generally at 34. If the stator is movable then the rotor element will be designed to be stationarily mounted and if the rotor is to be movable the support will be pivoted and movable about an axis such as XX in Figure 4 coincident with the center line of the stator. In assembled relationship, the rotor is designed to encircle the stator and be disposed adjacent the flanges or outer periphery of the flanges 11—14 and adjacent the polar projections 15 thereon with a substantially constant air gap between the polar projections 15 and the flanges 11 and 12 around the extent of the stator and rotor elements. The stator is mounted through suitable flanges 35 such as are shown in Figure 4 and may be the stationary or movable depending upon which of the elements is designed to be actuated.

The rotor and stator as previously indicated are shown in assembled relation in Figure 4 and in section in Figure 3 to define a relationship between the exciting and secondary windings, the stator member 10 with the polar projections 15 on the flanges 13 and 14 thereof, and the magnetic paths 28 of the rotor element 25. It will be seen that the magnetic paths are designed to be located in a neutral position in which the paths are disposed adjacent and overlapping adjacent pole projections or teeth on respective flanges 13 and 14. In this manner the magnetic paths of the rotor element 25 complete a magnetic circuit through the flanges 11-14 to variably and inductively couple the exciting winding with the secondary windings 21 and 22. Assuming at the present time that the rotor element is displaced relative to the stator such that the magnetic paths 28 are covering more of the polar projections 15 on the flange 13 than polar projections on the flange 14 it will be seen that magnetic circuits are provided through the flange 13 and the main body of the stator to the flange 12 and back through the magnetic portion 28 of the stator encircling the exciting winding and secondary winding 22 to inductively couple the same. This magnetic circuit or circuits will provide the paths of the least magnetic reluctance and consequently the greater portion of flux flow in the magnetic circuit or circuits or between the stator and rotor will be present. It will also be evident that a certain amount of flux will flow in a path between the flange 14, the main body of the stator 10 and the flange 11 and back through the magnetic portions 28 to the polar projections 15 on flange 14. Because of the greater air gap in these magnetic circuits due to the existence of the spacings 16 between the poles or projections 15, the magnetic reluctance of this circuit will be high and the magnetic flux flow low thereby decreasing the coupling between the exciting winding 20 and the secondary winding 21. Inasmuch as the coils 21 and 22 are connected in series opposition, the resultant current flow between the extremities of these windings will be such that a signal will be provided at a definite phase and variable magnitude depending upon the relative position of the stator and rotor. A reversal of relation or a movement of the relative position of a stator and rotor in the opposite direction will reverse the location of the predominant flux flow in the magnetic circuitry and the winding 21 will be coupled with the exciting winding 20 to a greater degree than the winding 22 is coupled with the exciting winding 20. The resultant output from the series connected secondary windings in this case will be of an opposite phase and also of a magnitude depending upon the position of the stator with respect to the rotor. When the outer windings are the energizing windings, they are so wound and connected that the flux lines emanating from each are directed in the same direction relative to the centrally located secondary winding, that is either toward or away from the secondary winding. The flux paths or magnetic circuits remain the same as that described above and the centrally located secondary winding will be coupled by flux lines which are opposed in direction of flux flow thereby inducing in the secondary winding opposed currents the resultant of which varies with phase and magnitude depending upon which of the portions of the primary winding is coupled to a greater degree with the secondary windings by virtue of the position of the rotor 25 relative to stator 12.

In utilizing alternating current energization of the exciting coil relative displacement of the rotor with respect to the stator would give a displacement signal output from the coils 21 and 22. Should a direct current be applied to the exciting winding 20 in place of an alternating current, the resultant voltage induced in the windings 21 and 22 would be in proportion to rate of change of position of the transformer parts or the rate of movement of the rotor with respect to the stator. The circuitry involved in this instance is the same and the operation of the device is similar. When the transformer is used in connection with a rate gyroscope then the resultant signals obtained therefrom will be rate and acceleration signals for A. C. and D. C. excitations respectively.

The dynamoelectric transformer may also be used as a damping device under circumstances in which the centrally located exciting winding 20 is energized with a signal of one polarity and the serially connected secondary windings 21 and 22 are similarly connected with a source of power of the same polarity whether it be alternating current or direct current. In this instance, there will be an equal attraction between the magnetic paths 28 and the magnetic circuits formed by the respective windings such that relative rotative movement between the stator and rotor will be electromagnetically damped in a conventional manner.

It should also be evident that while the apparatus disclosed herein shows the peripheral flanges of the stator on the outer periphery of the same and the rotor encircling the stator, that a reversal in the arrangement of parts may be readily made without departing from the scope of the invention or the teaching of the same. Thus inwardly directed flanges and pole teeth on the stator and a rotor element located in the confines of the stator will function in a similar manner. The tapered faces 27 are provided on the surface of the rotor element for the purpose of more accurately defining the magnetic circuit and for ease in machining of the parts. It should be kept in mind in considering this invention that the present disclosure is intended to be illustrative only, and the scope of the invention is to be determined by the appended claims.

I claim as my invention:

1. A dynamoelectric transformer comprising, a unitary annular stator member of magnetic material having a pair of transversely extending peripheral flanges at the extremities thereof, a pair of intermediate transversely extending flanges, said flanges at the extremities of said stator being circumferential, said intermediate flanges having a plurality of pole teeth thereon, the teeth on one flange being positioned adjacent openings between teeth on the opposite intermediate flange, an exciting winding wound around said stator member and positioned between said intermediate flanges being energized from an alternating current supply, a secondary winding wound around said stator member with portions thereof positioned respectively between the intermediate flanges and said peripheral end flanges, a cylindrical unitary rotor member of magnetic material having a plurality of apertures therein, said rotor being positioned around said stator and adapted to rotate relative thereto.

2. A dynamoelectric transformer comprising, a unitary annular stator member of magnetic material having a pair of transversely extending peripheral flanges at the extremities thereof, a pair of intermediate transversely extending flanges, said flanges at the extremities of said stator being circumferential, said intermediate flanges having a plurality of pole teeth thereon, the teeth on one flange being positioned adjacent openings between teeth on the opposite intermediate flange, first winding wound around said stator member positioned between said intermediate flanges, a split second winding wound around said stator member with portions positioned respectively between the intermediate flanges and said peripheral end flanges, a cylindrical unitary rotor member of magnetic material having a plurality of apertures therein, said rotor being positioned around said stator and adapted to rotate relative thereto, the apertures in said rotor member being substantially equal to the spacing between the pole teeth on the intermediate flanges, one of said windings being energized from a source of electrical power.

3. A dynamoelectric transformer comprising, a unitary annular stator member of magnetic material having a pair of transversely extending peripheral flanges at the extremities thereof, a pair of intermediate transversely extending flanges, said flanges at the extremities of said stator being circumferential, said intermediate flanges having a plurality of pole teeth thereon, the teeth on one flange being positioned adjacent openings between teeth on the opposite intermediate flange, a first winding wound around said stator member positioned between said intermediate flanges, a split second winding wound around stator member with portions thereof positioned respectively between the intermediate flanges and said peripheral end flanges, a unitary annular rotor of magnetic material having a plurality of magnetic paths thereon, said magnetic paths being spaced apart a distance substantially equal to the distance between the pole teeth on said stator intermediate flanges, said rotor being positioned around said stator and adapted to rotate relative thereto, one of said windings being energized from a source of electrical power.

4. A dynamoelectric transformer comprising, a unitary stator of magnetic material having a plurality of windings encircling the same, a plurality of polar projections positioned on the outer periphery of said stator intermediate its extent and separating a first of said windings from portions of the remaining winding, one of said windings being energized from a source of electrical power, a unitary rotor element having a plurality of magnetic paths thereon positioned adjacent the polar projections of said stator and encircling the same, said rotor being mounted for rotational movement relative to said stator, the magnetic paths of said rotor cooperating with said stator and the polar projections thereon to provide variable magnetic circuits and variable conductor coupling between said windings.

5. A dynamoelectric transformer comprising, a unitary stator of magnetic material having a plurality of windings encircling the same, a plurality of polar projections positioned on the outer periphery of said stator intermediate its extent and separating a first of said windings from portions of the remaining winding, one of said windings being energized from a source of electrical power, a unitary rotor element having a plurality of magnetic paths thereon positioned adjacent said polar projections of said stator and encircling said stator, said rotor being mounted for rotational movement relative to said stator and having a neutral position, the magnetic paths on said rotor cooperating with said stator and the polar projections thereon to provide a variable and inductive coupling between said windings depending upon the direction and amount of movement of said rotor from said neutral position.

6. A dynamoelectric transformer comprising, a unitary stator of magnetic material having a plurality of windings encircling the same, one of said windings being energized with an alternating current source of power, the remainder of said windings being connected in a series relationship, a plurality of polar projections positioned on the outer periphery of said stator intermediate its extent and separating the exciting winding from the remaining winding, a unitary rotor element having a plurality of magnetic paths thereon, means mounting said stator and said rotor such that said magnetic paths are positioned adjacent the polar projections of said stator and rotational relative movement is provided between said rotor and said stator, the magnetic paths of said rotor cooperating with said stator and the polar projections thereon to provide for variable magnetic circuits and a variable inductive coupling between said exciting winding and said remaining windings.

7. A dynamoelectric transformer comprising, a unitary annular stator of magnetic material having a plurality of windings associated therewith, one of said windings being energized with an alternating current source of power, the remainder of said windings being connected in series opposition, a plurality of polar projections positioned on a peripheral surface of said stator intermediate its extent and separating the exciting winding from the remaining windings, a unitary rotor element having a plurality of magnetic paths thereon, positioned adjacent the polar projections of said stator, said rotor being mounted for rotational movement relative to said stator, the magnetic paths of said rotor cooperating with said stator member and polar projections thereon to provide variable magnetic circuits and variable inductive couplings between said exciting winding and the remaining windings.

8. A dynamoelectric transformer comprising, a unitary annular stator of magnetic material having a plurality of windings associated therewith, one of said windings adapted to have a signal induced therein, the remainder of said windings being connected to a source of power, a plurality of polar projections positioned on a peripheral surface of said stator intermediate its extent and separating the first winding from the remaining windings, a unitary rotor element having a plurality of magnetic paths thereon positioned adjacent the polar projections of said stator, means mounting said stator and said rotor to provide for rotational relative movement therebetween, said stator and said rotor having a normal position relative to one another, the magnetic paths of said rotor cooperating with said stator and polar projections thereon and to provide for variable and inductive couplings between the remaining windings and said first winding depending upon the direction and amount of the relative movement between the rotor and stator from the normal position.

9. A dynamoelectric transformer comprising, a unitary stator of magnetic material having a plurality of windings encircling the same, a plurality of polar projections positioned on the outer periphery of said stator with one of said windings positioned therebetween, a unitary rotor element having a plurality of magnetic paths thereon positioned adjacent the polar projections of said stator and encircling said stator, said rotor element being mounted for rotational relative movement with respect to said stator, the magnetic paths of said rotor element cooperating with said stator member and the polar projections thereon to provide for variable magnetic circuits and variable inductive couplings between said one of said windings and said remaining windings.

10. A dynamoelectric transformer comprising, a unitary annular stator member of magnetic material, a plurality of windings encircled in the same, a plurality of polar projections positioned on the outer periphery of said stator with a first winding positioned therebetween, and with portions of a second of said windings to either side of said projections remote from said first winding, said polar projections being spaced apart a predetermined distance from one another with the projections on one side of said first winding being positioned adjacent the spacing between the projections on the other side of said first winding, one of said windings being energized by a source of power, a unitary rotor element of magnetic material having a plurality of magnetic paths thereon positioned adjacent the polar projections on said stator and encircling said stator, said rotor being mounted for rotational movement relative to said stator and having a neutral position, and magnetic paths of said rotor element cooperating with said stator and said polar projections thereon to provide variable and inductive couplings between said windings depending upon the direction and amount of relative movement between said rotor element and said stator from said neutral position.

11. In a device of the class described comprising, a unitary stator of magnetic material having a plurality of windings encircling the same, a plurality of polar projections positioned on the outer periphery of said stator, one of said windings being positioned between said polar projections and the remaining windings being positioned between a row of said polar projections at the extremity of said stator, a unitary rotor element of magnetic material having a plurality of magnetic paths thereon positioned adjacent the polar projections on said stator and encircling the same, said rotor being mounted for rotational movement relative to said stator, the magnetic paths of said rotor element cooperating with said stator member and said polar projections thereon to provide variable magnetic circuits between said stator and said rotor elements.

12. In a device of the class described comprising, a unitary stator of magnetic material having a plurality of windings encircling the same, a plurality of polar projections positioned on the outer periphery of said stator, one of said windings being positioned between said polar projections and the remaining windings being positioned between a row of said polar projections at the extremity of said stator, a unitary rotor element of magnetic material having a plurality of magnetic paths thereon positioned adjacent the polar projections on said stator and encircling the same, said rotor being mounted for rotational movement relative to said stator, the magnetic paths of said rotor element cooperating with said stator member and said polar projections thereon to provide variable magnetic circuits between said stator and said rotor elements, and means energizing said one of said windings with a source of electrical potential of one phase and the remaining of said windings with a source of electrical potential of the same phase.

13. A dynamoelectric transformer comprising, a unitary annular stator member of magnetic material having a pair of transversely extending peripheral flanges at the extremities thereof, a pair of intermediate transversely extending flanges, said flanges at the extremities of said stator being circumferential, said intermediate flanges having a plurality of pole teeth thereon, the teeth on one flange being positioned adjacent openings between teeth on the opposite intermediate flange, a first winding wound around said stator member and positioned between said intermediate flanges, a pair of serially connected additional windings wound around said stator member and positioned respectively between the intermediate flanges and said peripheral end flanges, a unitary annular rotor member of magnetic material having a plurality of apertures therein, said rotor being positioned around said stator and adapted to rotate relative thereto.

14. A dynamoelectric transformer comprising, a unitary annular stator member of magnetic material having a pair of transversely extending peripheral flanges at the extremities thereof, a pair of intermediate transversely extending flanges, said flanges at the extremities of said stator being circumferential, said intermediate flanges having a plurality of pole teeth thereon, the teeth on one flange being positioned adjacent openings between teeth on the opposite intermediate flange, the exciting winding wound around said stator member positioned between said intermediate flanges, being energized by an electrical source of power, a pair of serially connected secondary windings wound around said stator member and positioned respectively between the intermediate flanges and said peripheral end flanges, a unitary annular rotor member of magnetic material having a plurality of apertures therein, said rotor being positioned around said stator and adapted to rotate relative thereto.

References Cited in the file of this patent

UNITED STATES PATENTS

| 1,844,649 | Greibach | Feb. 9, 1932 |

FOREIGN PATENTS

| 4,366 | Great Britain | of 1894 |
| 6,838 | Great Britain | of 1906 |
| 51,298 | Germany | Mar. 21, 1890 |
| 156,908 | Germany | Dec. 8, 1904 |